(No Model.)
S. M. FRIEDE.
COMBINATION SOFT AND HARD METAL PIPE COUPLING.
No. 566,855. Patented Sept. 1, 1896.
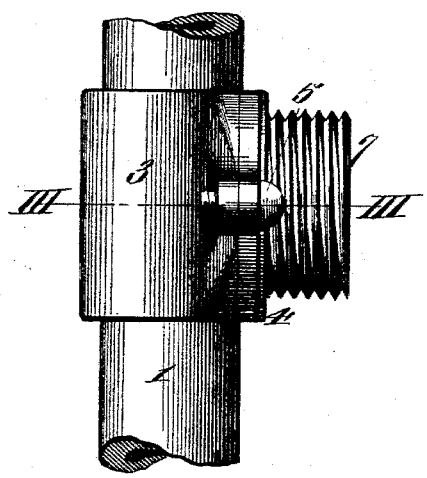
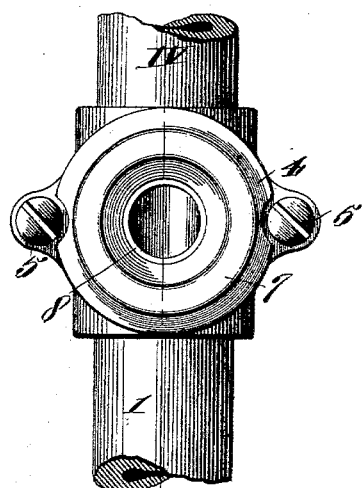
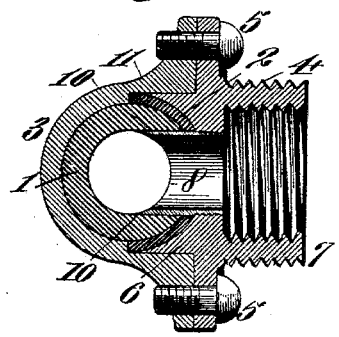
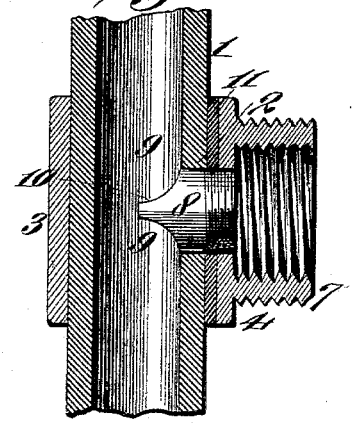
Attest:
E. S. Knight
H. Finley
Inventor:
Samuel M. Friede,
By Knight Bro.
Attys.
THE NORRIS PETERS CO., PHOTO-LITHO., WASHINGTON, D. C.

UNITED STATES PATENT OFFICE.

SAMUEL M. FRIEDE, OF CHICAGO, ILLINOIS, ASSIGNOR OF ONE-THIRD TO JOHN W. DONNELL, OF ST. LOUIS, MISSOURI.

COMBINATION SOFT AND HARD METAL PIPE-COUPLING.

SPECIFICATION forming part of Letters Patent No. 566,855, dated September 1, 1896.

Application filed December 16, 1895. Serial No. 572,275. (No model.)

*To all whom it may concern:*

Be it known that I, SAMUEL M. FRIEDE, of Chicago, Cook county, State of Illinois, have invented a certain new and useful Improvement in a Combination Soft and Hard Metal Pipe-Coupling, of which the following is a full, clear, and exact description, reference being had to the accompanying drawings, forming a part of this specification.

My invention relates to a coupling for joining a hard-metal pipe to the side of a soft-metal pipe, in which is the provision of an opening for the reception of a peculiarly-formed tube extended into the soft-metal pipe for the purpose of preventing the compression of the soft-metal pipe in the action of clamping the coupling thereto.

My invention consists in features of novelty hereinafter fully described, and pointed out in the claims.

Figure I is a side elevation of my improved coupling. Fig. II is an elevation looking at the face of the nipple of the coupling. Fig. III illustrates a cross-section taken on line III III, Fig. I. Fig. IV illustrates a longitudinal section taken on line IV IV, Fig. II.

In the drawings, 1 designates a soft-metal pipe, such as lead, in the side of which is formed an opening 2, at which the coupling is attached. The coupling has two members 3 and 4, joined by screws 5 or similar devices, and which members together form a collar that surrounds the pipe 1.

The member 4 is provided with projections 6, that fit within the member 3, and a nipple 7, having interior and exterior threads, by means of which a hard-metal pipe, such as iron, is attached to the member, by this arrangement providing for the attachment of varying-sized pipes by screwing the pipe either into the nipple on onto it.

8 designates a tube of hard metal that is provided at one end with a screw-thread, by means of which it is attached to the coupler member 4 at the base of the nipple 7, and which extends through the opening 2 into the interior of the soft-metal pipe 1. The sides of this tube are cut away at 9, (see Fig. IV,) to permit an unobstructed passage in the pipe 1, but leaving points 10 located at the sides of the pipe. These points are very essential features of my invention, for, lying as they do against the interior walls of the pipe, they provide supports that prevent the crushing of the soft pipe in the action of clamping the members 3 and 4 to the pipe, which in their absence would result.

11 designates a rubber or other gasket placed between the inner curved surface of the coupling members 4 and the pipe 1 for the purpose of accomplishing a tight joint when the coupling members are drawn together.

I claim as my invention—

1. In a coupling for joining a hard-metal pipe to the side of a soft-metal pipe provided with an opening in its side, the combination of two coupling members suitably connected to form a collar around said soft-metal pipe, one of said members being provided with means for the attachment of a hard-metal pipe, and carrying a tube adapted to enter said soft-metal pipe, through the opening in its side, the sides of said tube being cut away to form points for the purpose of supporting the walls of said soft-metal pipe, substantially as described.

2. In a coupling for joining a hard-metal pipe to the side of a soft-metal pipe provided with an opening in its side the combination of two coupling members suitably connected to form a collar surrounding said soft-metal pipe, one of said members being provided with a nipple for the attachment of a hard-metal pipe and carrying a tube adapted to enter said soft-metal pipe through the opening in its side, the sides of said tube being cut away to form points for the purpose of supporting the walls of said soft-metal pipe, substantially as described.

SAMUEL M. FRIEDE.

In presence of—
JOHN C. MILLER,
E. F. PFEIFFER.